United States Patent [19]
Yamamoto

[11] Patent Number: 5,616,375
[45] Date of Patent: Apr. 1, 1997

[54] AIR BAG

[75] Inventor: Kazuo Yamamoto, Yokohama, Japan

[73] Assignee: NSK, Ltd., Japan

[21] Appl. No.: 403,140

[22] Filed: Mar. 13, 1995

Related U.S. Application Data

[63] Continuation of Ser. No. 963,667, Oct. 20, 1992, abandoned.

[30] Foreign Application Priority Data

Oct. 24, 1991 [JP] Japan .................................. 3-303839

[51] Int. Cl.⁶ .......................... A45B 19/00; B29D 22/00; B32B 7/04; B32B 31/06
[52] U.S. Cl. ........................... 428/12; 428/35.5; 428/420; 428/480
[58] Field of Search ........................... 428/12, 35.5, 257, 428/258, 420, 480; 280/731, 732, 743 A, 743 R, 728 R, 739, 730 R

[56] References Cited

U.S. PATENT DOCUMENTS 4,888,229  12/1989  Paley et al. ............................. 428/253
4,921,735   5/1990  Bloch ..................................... 428/34.9

*Primary Examiner*—Thurman K. Page
*Assistant Examiner*—Kathrynz E. Shelborne
*Attorney, Agent, or Firm*—Evenson, McKeown, Edwards & Lenahan, P.L.L.C.

[57] ABSTRACT

Cut fabric pieces useful in the fabrication of an air bag are described. Each cut fabric piece has been prepared by cutting a woven fabric formed of warp yarns and weft yarns in a predetermined pattern. The warp yarns and the weft yarns in a portion of the cut fabric piece, said portion being located in the vicinity of each cut part in the cut fabric piece, are fusion-bonded at a predetermined width. A process for the preparation of the cut fabric pieces, an air bag making use of the cut fabric pieces and a process for the fabrication of the air bag are also described.

3 Claims, 6 Drawing Sheets

AIR BAG

This application is a continuation of application Ser. No. 07/963,667, filed Oct. 20, 1992 now abandoned.

BACKGROUND OF THE INVENTION

1) Field of the Invention

This invention relates to improvements in an air bag for use in an air bag system in which the air bag is promptly inflated in the event of a collision of an automotive vehicle or the like to protect an occupant from impact.

2) Description of the Related Art

As a cushioning system for providing additional safety beyond that provided by a seat belt system for holding safely an occupant or the like of a vehicle, an air bag system has been put into practical use. With the air bag system, the body of an occupant, especially his head and chest, is supported by a balloon-like air bag in the event of a collision and the internal gas is then gradually released, whereby a cushioning stroke is prolonged to reduce impact to the body.

Such an air bag system includes a module constructed of a center pad, a folded air bag, an inflator (gas generator) and the like. The module can be built into a steering wheel, for example. When triggered by an electric signal from a sensor which has detected a vehicular collision, the inflator is activated so that the air bag is instantaneously inflated by the resulting gas. Upon activation of the air bag system, a top wall of the center pad is split apart by the expanding pressure of the air bag, thus allowing the air bag to come out through the resulting opening and to be inflated substantially above the center pad. When the module of the air bag system is arranged inside an instrument panel, activation of the air bag system either tears apart or opens an air bag cover by the resulting expansion pressure of the air bag, thus permitting substantial inflation of the air bag.

Conventional air bags have each been fabricated by coating a woven fabric, which is formed of synthetic fibers such as nylon 66 fibers, nylon 6 fibers, polyester fibers or aramid fibers, with synthetic rubber, cutting the resulting, coated base fabric in a predetermined pattern to obtain cut fabric pieces and then sewing the cut fabric pieces along the peripheries thereof by a sewing machine.

In all such conventional air bags, the woven fabric is coated over its entire surfaces with a synthetic rubber composed of a chloroprene copolymer, a silicone rubber or the like so as to avoid the potential danger that, due to leakage of gas from the inflated air bag, the inertial energy of an occupant is not sufficiently absorbed and the occupant hence collides against a steering wheel or a dashboard. This has, however, led to the problem that the air bag so fabricated is heavy and stiff and its fabrication cost is high.

An air bag system making use of a special air bag has therefore been proposed. To fabricate the special air bag, a woven fabric with a high set to reduce gas permeation therethrough is employed. This woven fabric is cut without coating the woven fabric with a synthetic rubber such as described above. The cut fabric pieces thus prepared are then sewn into the special air bag.

The preparation of cut fabric pieces by cutting a fabric not provided with any synthetic rubber coating, in a predetermined pattern as described above, however, results in the problem that the cut fabric pieces may fray where cut, such as at the outer peripheries of the cut fabric pieces and the inner peripheries of openings and/or holes thereof. Such fraying leads to reduced strength adjacent to the cuts, so that sewn parts in the outer peripheries of the cut fabric pieces sewn by a sewing machine as described above undergo seam slippage by abrupt inflation of the resulting air bag. Fraying may therefore lead to gas leakage and/or fabric rupture. Such gas leakage causes a problem in that the air bag fails to fully absorb inertial kinetic energy of an occupant in the event of a vehicular collision.

Upon fabrication of an air bag by sewing a plurality of cut fabric pieces, the sewing must be conducted without risk of any appreciable reduction in strength by seam slippage or deviation of stitches from the correct stitch line. Such sewing requires substantial cost, leading to high fabrication cost.

SUMMARY OF THE INVENTION

An object of this invention is to overcome the above problems and hence to provide a low-price, high-quality air bag which is free from both fraying where cut and strength reduction at sewn parts, without application of a coating of synthetic rubber to a woven fabric.

In one aspect of this invention, there is thus provided a cut fabric piece for an air bag, which cut fabric piece has been prepared by cutting a woven fabric formed of warp yarns and weft yarns in a predetermined pattern. The warp yarns and the weft yarns in a portion of the cut fabric piece, said portion being located in the vicinity of each cut part in the cut fabric piece, are fusion-bonded at a predetermined width.

In another aspect of this invention, there is also provided a process for preparing a cut fabric piece for an air bag by cutting a woven fabric formed of warp yarns and weft yarns in a predetermined pattern. The process comprises fusion-bonding at a predetermined width the warp yarns and weft yarns in a predetermined portion of the woven fabric and then cutting the woven fabric along the fusion-bonded, predetermined portion to prepare the cut fabric piece.

In a further aspect of this invention, there is also provided an air bag composed of a bag-shaped body formed by sewing at least two cut fabric pieces along at least one sewing line, which cut fabric pieces have been prepared by cutting a woven fabric formed of warp yarns and weft yarns in a predetermined pattern. The warp yarns and the weft yarns in a portion of each of the cut fabric pieces, said portion being located in the vicinity of each cut part in the corresponding cut fabric piece, are fusion-bonded at a predetermined width.

In a still further aspect of the present invention, there is also provided a process for fabricating an air bag by cutting a woven fabric formed of warp yarns and weft yarns in a predetermined pattern to prepare at least two cut fabric pieces and then sewing said at least two cut fabric pieces into a bag-shaped body. The process comprises fusion-bonding at a predetermined width the warp yarns and weft yarns in predetermined portions of the woven fabric and then cutting the woven fabric along the fusion-bonded, predetermined portions to prepare the cut fabric pieces.

According to the present invention, the warp yarns and weft yarns in each cut part of each cut fabric piece are fusion-bonded into an integrated solid structure. Even when a woven fabric having no coating of synthetic rubber is used, it is therefore still possible to prevent fraying of the cut part and hence to improve the strength of a sewn part along an outer periphery of the cut fabric piece.

The present invention can therefore prevent cut parts of each cut fabric piece from becoming frayed without applying a synthetic rubber coating which, if it were applied, would make the cut fabric piece heavier and stiffer and would raise the production cost of such cut fabric pieces.

When a woven fabric having a coating of synthetic rubber is used, the present invention can improve the strength of each cut part and hence the strength of its corresponding sewn part. Sewing work is therefore facilitated, thereby making it possible to reduce the production cost.

Accordingly, the present invention can economically provide a high-quality air bag which can assure fail-free actuation of an air bag system owing to the prevention of any appreciable reduction of strength at each cut part and hence any accidental gas leakage upon actuation of the air bag system.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
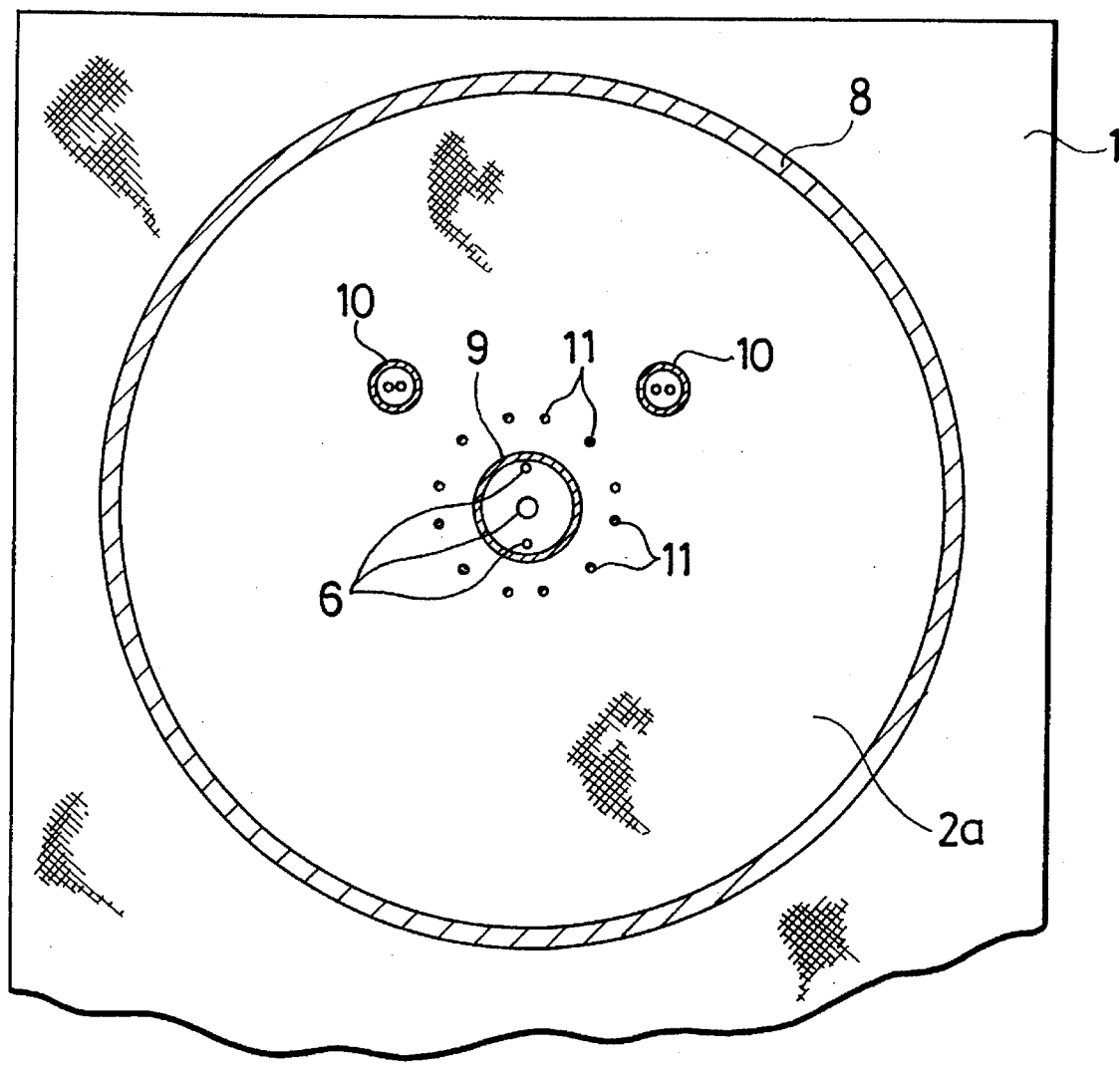
FIG. 1 is a fragmentary plan view of a woven fabric, from which cut fabric pieces according to one embodiment of the invention are to be cut out for use in the fabrication of an air bag.
Figure 3:
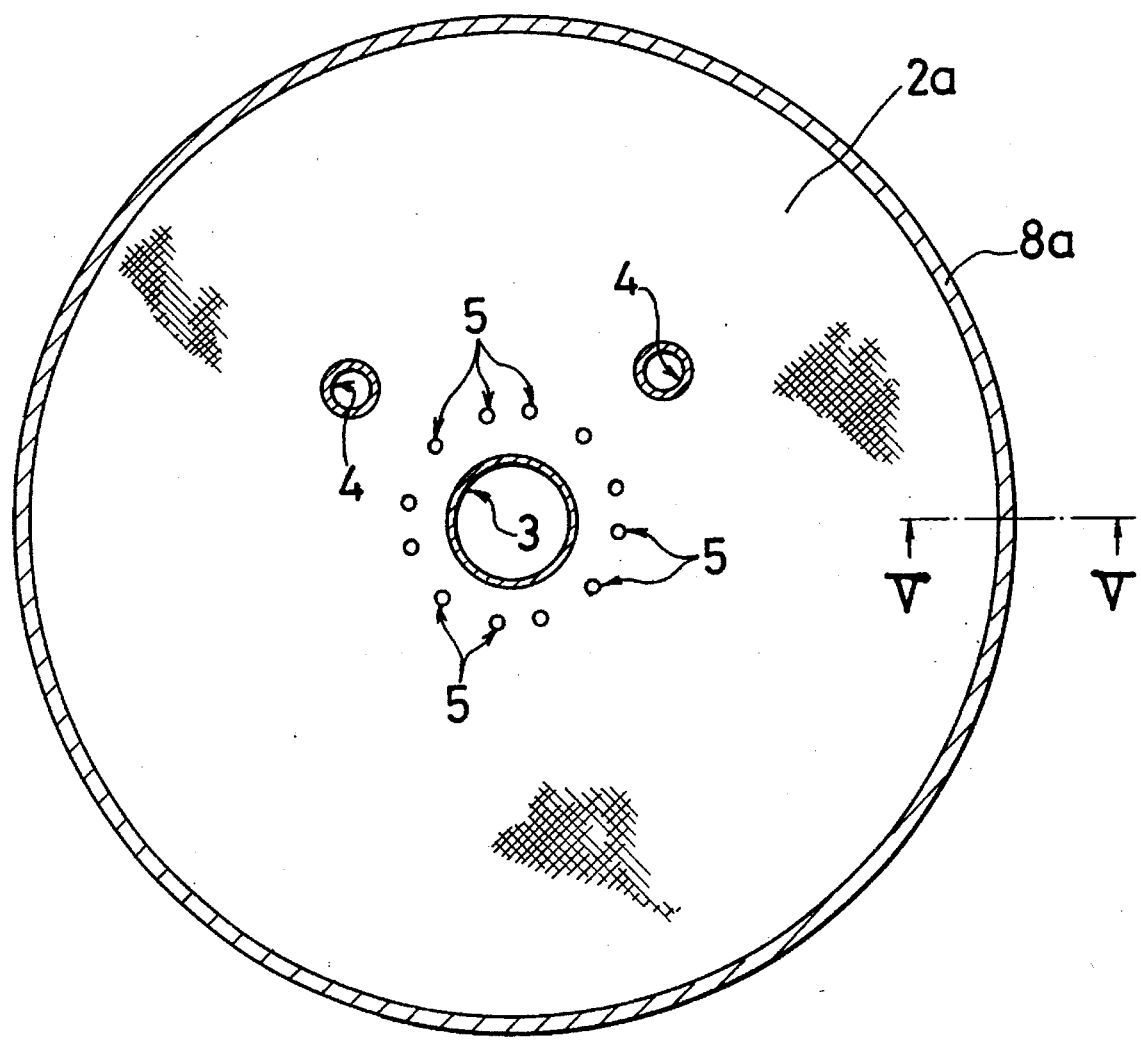
FIG. 3 is a plan view of one of the cut fabric pieces referred to above.
Figure 5:
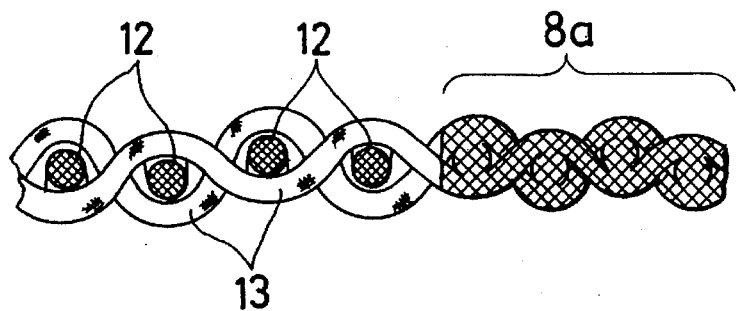
FIG. 5 is an enlarged cross-sectional view of the cut fabric piece, taken in the direction of arrows V—V of FIG. 3.
Figure 6:
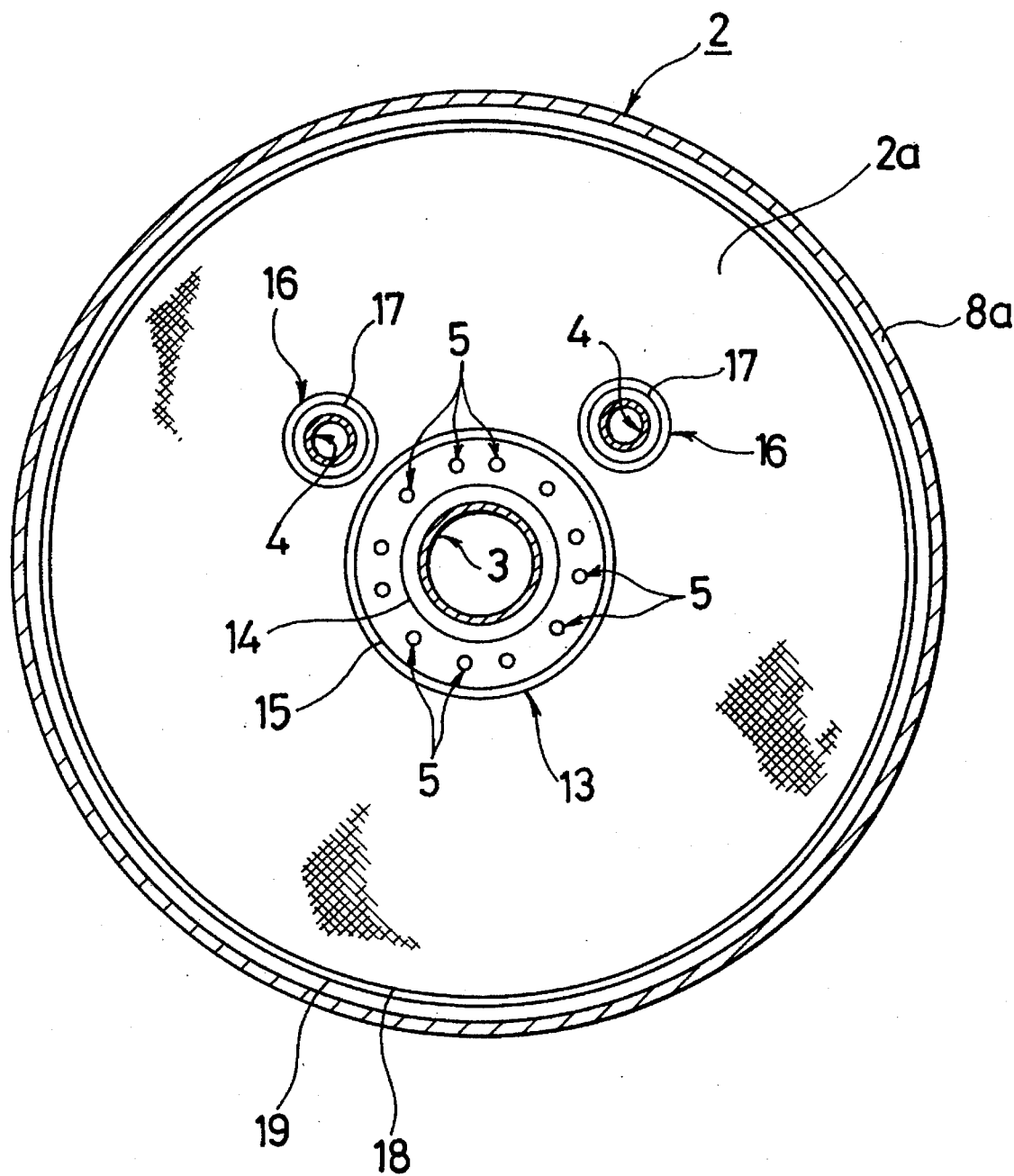
FIG. 6 is a plan view of the above cut fabric pieces immediately after they have been sewn together into an air bag.
Figure 7:
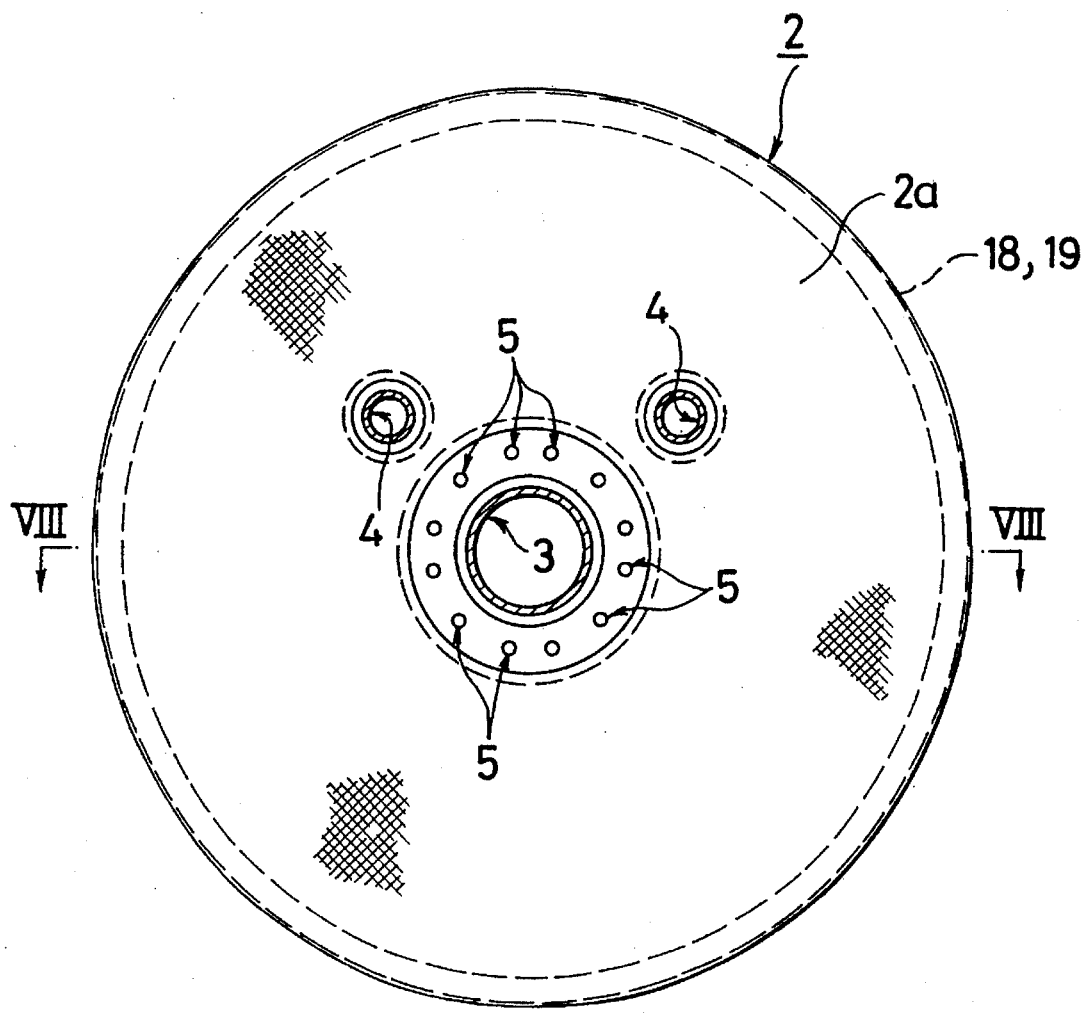
FIG. 7 is a plan view of the air bag of FIG. 6 after the air bag has been turned inside out.
Figure 8:
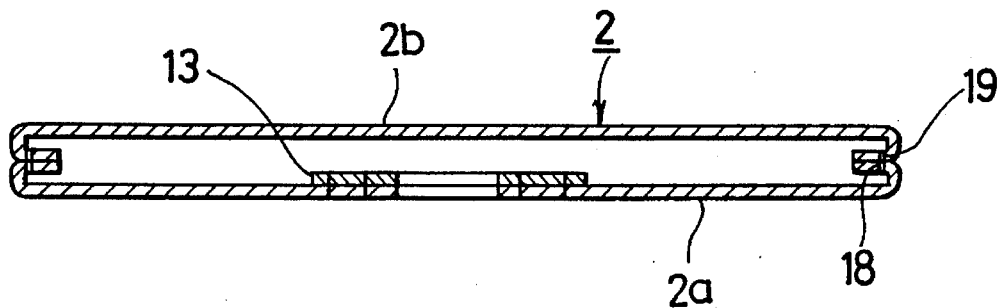
FIG. 8 is a cross-sectional view of the air bag, taken in the direction of arrows VIII—VIII of FIG. 7.

Referring first to FIG. 1, there is shown a woven fabric 1 which is employed to obtain a cut fabric piece 2a for use as a lower piece (i.e., the piece to be fixed to an inflator when installed in an interior of a vehicle) of an air bag 2 for a driver's seat (see FIGS. 6–8). By cutting the woven fabric 1 in a predetermined pattern, the cut piece 2a shown in FIG. 3 is obtained. In this embodiment, the woven fabric 1 is composed of warp yarns 12 and weft yarns 13 which are both made of synthetic fibers (see FIG. 5). It is to be noted that no synthetic rubber coating is applied on any surface of the woven fabric 1.

In the woven fabric 1, the warp yarns 12 and the weft yarns 13 in each region indicated by hatching in FIG. 1 are fusion-bonded beforehand into an integral solid structure by a high-frequency sewing machine in accordance with the present invention before the cut fabric piece 2a is prepared (see FIG. 5). A fusion-bonded region 8 corresponds to an outer peripheral edge portion of the cut fabric piece 2a, a fusion-bonded region 9 to an inflator attachment opening 3, fusion-bonded regions 10 to gas release openings, and fusion-bonded regions 11 to inflator attachment holes 5.

Figure 2:
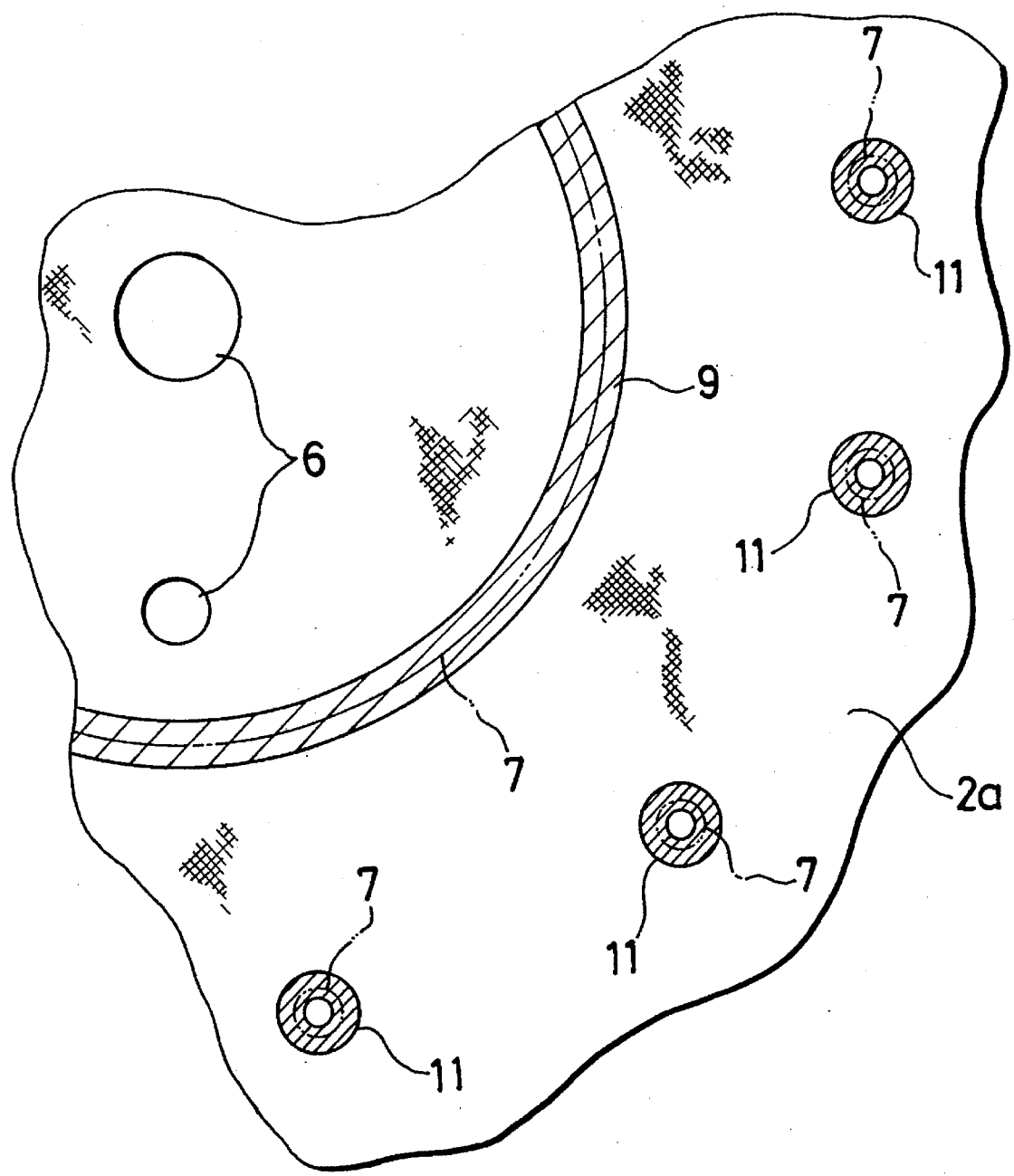
FIG. 2 is an enlarged, fragmentary view of the fabric of FIG. 1.

Each of these individual regions 8, 9, 10 and 11 is, as illustrated in FIG. 2, fusion-bonded in such a way that it has a predetermined width on both sides of its corresponding cutting line 7 adapted to cut the outer peripheral edge portion, inflator attachment opening 3, gas release opening 4 or inflator attachment hole 5 and it includes the cutting line 7. Incidentally, a guide hole 6 formed almost centrally in the woven fabric serves to perform positioning of the woven fabric 1 upon fusion-bonding and cutting so that it does not require fusion-bonding.

Figure 4:
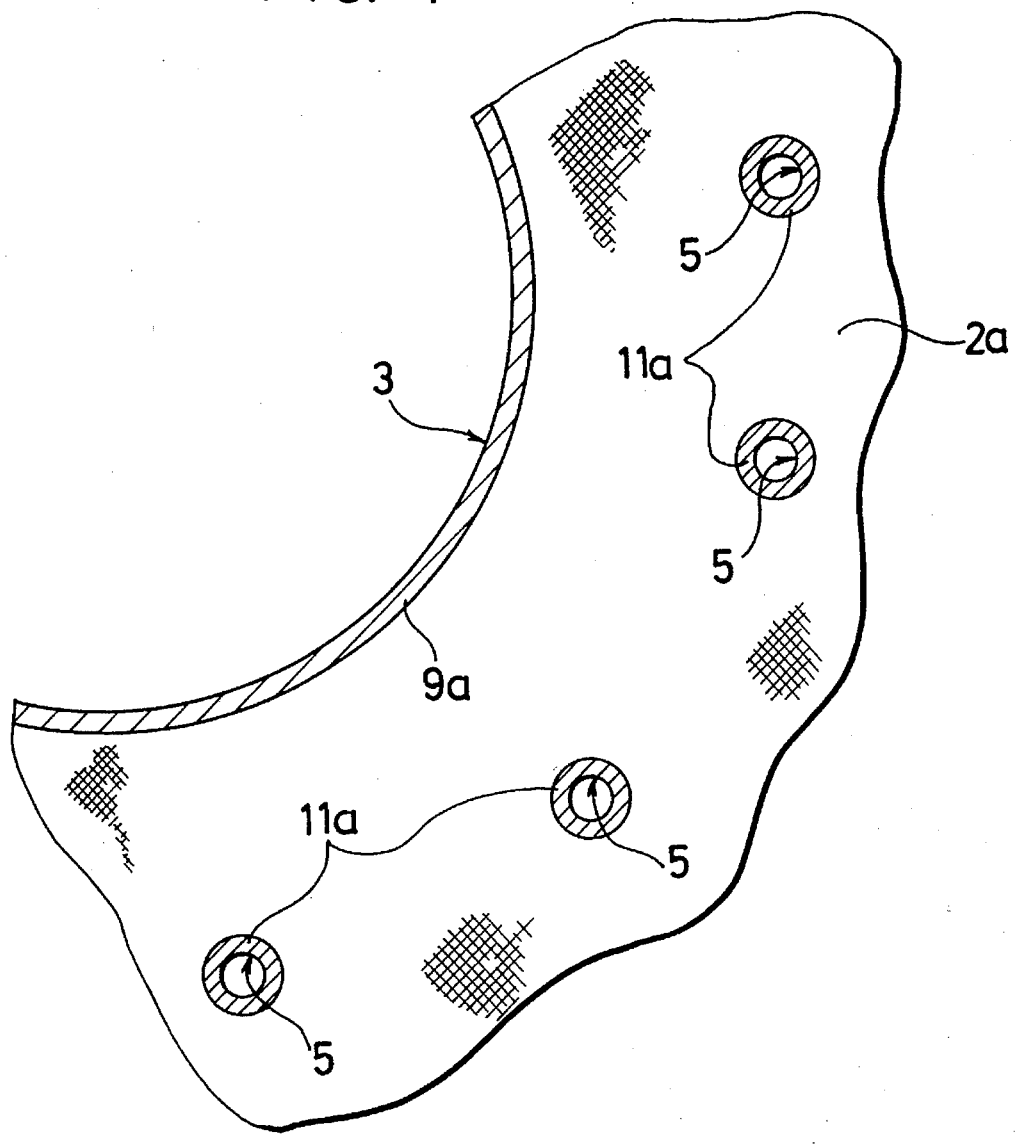
FIG. 4 is an enlarged, fragmentary view of the cut fabric piece of FIG. 3.

By cutting the woven fabric 1 along the respective cutting lines 7, the cut fabric piece 2a shown in FIGS. 3 and 4 is obtained next. Here, fusion-bonded portions 8a, 9a, 11a remain at the outer peripheral edge portion of the cut fabric piece 2a and at inner peripheral edge portions of the inflator attachment opening 3, gas release openings 4 and inflator attachment holes 5 of the cut fabric piece 2a, respectively. Since the warp yarns 12 and weft yarns 13 in the fusion-bonded portion 8a have been fusion-bonded into an integral solid structure as depicted in FIG. 5, the warp yarns 12 and weft yarns 13 do not become loose at the cut part although no synthetic rubber coating has been applied beforehand on the woven fabric 1. Of course, this also applies equally to the other fusion-bonded portions 9a, 11a. Such integral solid structures can facilitate the cutting of the cut fabric piece 2a from the woven fabric 1.

To the cut fabric piece 2a, a reinforcement fabric 13 and a reinforcement fabric 16 are then sewn by sewing thread 14,15 around the inflator attachment holes 5 and sewing thread 17 around the gas release openings 4, respectively, as shown in FIG. 6.

On the other hand, a woven fabric employed to obtain a cut fabric piece 2b (see FIG. 8) for use as a front-side wall (i.e., a driver- or passenger-side wall when installed on the vehicle body) is not applied with any synthetic rubber coating like the woven fabric 1 described above. Because gas release openings and the like are not formed in the cut fabric piece 2b, the warp yarns and weft yarns in a region corresponding to an outer peripheral edge portion of the cut fabric piece are fusion-bonded before cutting the cut fabric piece, whereby synthetic fibers are prevented from fraying.

The cut fabric pieces 2a, 2b are then joined together by sewing them at the outer peripheral edge portions thereof by a sewing machine (in the illustrated embodiment, by two thread chain stitches using sewing thread 18,19), so that the air bag 2 is formed. After turning the air bag 2 inside out as depicted in FIGS. 7 and 8, the air bag 2 is attached to an inflator arranged centrally in a steering wheel. In view of the fact that each fusion-bonded portion tends to become brittle due to its solidification, it is preferred to conduct the sewing by sewing thread 14, 15, 17, 18, 19 at positions not overlapped with the fusion-bonded portions as shown in FIG. 6.

In the illustrated embodiment, the cut parts such as the outer peripheral edge portion of the cut fabric piece 2a and its inner peripheral edge portions of the inflator attachment opening 3, gas release openings 4 and inflator attachment holes 5 are protected from weakening caused by fraying of synthetic fibers, whereby portions sewn by the sewing machine and inflator attachment portions are prevented from developing stitch wandering or tearing upon abrupt inflation of the air bag.

Although the woven fabric described above is not applied with any coating of synthetic rubber, it is to be noted that the present invention can also be applied to a woven fabric with a coating of synthetic rubber for the fabrication of an air bag. Each cut part of each cut fabric piece, which has the coating of synthetic rubber, is fusion-bonded into an integral solid structure. The strength of each sewn part is therefore improved, thereby lowering the potential problem of weakening due to seam slippage or deviation of stitches from the correct seam line. It is therefore possible to avoid the potential trouble that the gas leaks out due to seam slippage or tearing at a cut part as described above and the air bag fails to sufficiently absorb inertial kinetic energy of an occupant in the event of a vehicular collision. Further, the application of the present invention can lower the fabrication cost of the air bag.

It is also to be noted that the shape of the air bag is not limited to the shape of the above embodiment and various shapes can of course be adopted. Although the air bag for the driver's seat has been described above, the present invention can, needless to say, be applied to an air bag for a front passenger's seat. In addition, the fusion-bonding means is not limited to the high-frequency sewing machine described above and other fusion-bonding means such as an ultrasonic sealing machine can also be employed likewise.

In the embodiment described above, each fusion-bonded portion was formed to include its corresponding cutting line. However, this is not an essential requirement. Each fusion-bonded portion can be formed between its corresponding cutting line and sewn part.

I claim:

1. In an air bag composed of a bag-shaped body formed by sewing at least two cut fabric pieces along at least one sewing line, said cut fabric pieces having been prepared by cutting a woven fabric formed of warp yarns and weft yarns in a predetermined pattern, the improvement wherein the warp yarns and the weft yarns in a portion of each of the cut fabric pieces are fusion bonded into an integrated solid structure at a predetermined width, said portion being located only in the vicinity of each cut part in the corresponding cut fabric piece.

2. The air bag of claim 1, wherein the portion fusion-bonded at the predetermined width includes the cut part.

3. The air bag of claim 1, wherein the sewing line is provided without overlap with the portion fusion-bonded at the predetermined width.

* * * * *